(12) United States Patent
Hietmann et al.

(10) Patent No.: US 6,731,091 B2
(45) Date of Patent: May 4, 2004

(54) ROBOT

(75) Inventors: Gerhard Hietmann, Herbertshofen (DE); Thomas Finsterwald, Augsburg (DE)

(73) Assignee: Kuka Roboter GmbH, Augsburg (DE)

( * ) Notice: Subject to any disclaimer, the term of this patent is extended or adjusted under 35 U.S.C. 154(b) by 0 days.

(21) Appl. No.: 09/892,031

(22) Filed: Jun. 26, 2001

(65) Prior Publication Data

US 2002/0014874 A1 Feb. 7, 2002

(30) Foreign Application Priority Data

Jul. 7, 2000  (DE) .......................................... 100 33 224

(51) Int. Cl.$^7$ ................................................ B25J 5/00
(52) U.S. Cl. .................. 318/568.12; 318/563; 318/641
(58) Field of Search ............................ 318/560, 568.11, 318/568.12, 563, 638, 641

(56) References Cited

U.S. PATENT DOCUMENTS

| 5,619,111 A | * | 4/1997 | Katagiri et al. ............. 318/105 |
| 5,658,121 A | | 8/1997 | Hashimoto |
| 5,814,960 A | * | 9/1998 | Ookura et al. .......... 318/568.11 |
| 5,945,011 A | | 8/1999 | Takano et al. |
| 6,408,710 B1 | * | 6/2002 | Kullborg et al. .............. 310/64 |

FOREIGN PATENT DOCUMENTS

| DE | 40 19 217 C2 | 3/1998 |
| DE | 297 11 523 | 9/1998 |
| DE | 198 46 960 A1 | 4/2000 |
| EP | 0 728 559 | 8/1996 |
| WO | WO/99/15319 | 4/1999 |

* cited by examiner

Primary Examiner—Marlon T. Fletcher
(74) Attorney, Agent, or Firm—McGlew and Tuttle, P.C.

(57) ABSTRACT

A robot has a robot structure, preferably a plurality of interconnected arms. The robot also has drives for driving the arms, and a plurality of electronic drive units for operating and controlling the drives. The electronic drive units generate heat when in operation and are distributed on the robot structure at spaced locations from each other. A thermal insulation is arranged between the robot structure and the drive electronics. A cooling device is arranged on the drive electronics and is spaced from the robot structure.

20 Claims, 5 Drawing Sheets

ROBOT

FIELD OF THE INVENTION

The invention relates to a robot with drive electronics arranged in distributed manner.

BACKGROUND OF THE INVENTION

DE 198 46 960 A1 discloses a handling device on a plastics processing machine with on the latter drive motors associated in conventional manner with the parts to be driven, as well as a central control console on which are located both a central feed unit for supplying power to the drive motors and a central control unit for supplying the drive motors with control information.

It has repeatedly been proposed in the case of a robot to position electronic components, particularly components of the drive electronics, such as inverters, servo amplifiers, power semiconductors, drive circuits, ammeters and regulating circuits in distributed manner on the robot structure instead of centrally in a base or separate switch cabinet. As such power electronics generate heat, the heat dissipation problem arises. In view of the fact that the robot structure and the robot carrying elements are made from metal and the latter has a good thermal conductivity, it has been proposed that the power electronics be connected in good heat conducting manner to the robot structure or a gearbox and to dissipate or remove heat via the latter. The disadvantage is that the materials used have a considerable thermal expansion coefficient and therefore can lead to the heating of the robot structure or to different temperatures as a function of the loading condition and consequently to mechanical and geometrical changes. There can also be an increase in the motor temperature, which can lead to a power reduction and increased hazards in the case of contact, as well as to the gear temperature leading to a change in the lubricant and therefore to a reduction in the load carrying capacity and service life.

The same applies for the remote control device in the form of a manipulator according to DE 40 19 217 C2, where a printed circuit carrying electronic components is connected in heat conducting manner by means of the support to a metal base. Thus, here again the heat is dissipated by means of the supporting structure.

Therefore the problem of the invention is to provide an improved robot, whilst avoiding the indicated disadvantages.

SUMMARY OF THE INVENTION

According to the invention the set problem is solved in the case of a robot of the aforementioned type in that each drive electronics is thermally insulated with respect to the robot structure and is provided with a cooling device.

Thus, according to the invention the heat generated by the drive electronics distributed over the robot structure in the form of a drive amplifier is not introduced into the robot structure or parts thereof and instead is removed via the cooling device, which is separate to the robot structure, directly into the environment, so that there are no mechanical and geometrical changes to the robot structure due to the thermal expansion coefficients of the material thereof.

According to a preferred development each drive electronics is also mechanically connected to a passive cooling device associated therewith and in particular each drive electronics is held on the robot by means of its cooling device.

The cooling device can be constructed in different ways. However, in a preferred development the cooling device has a cooling body, particularly with cooling ribs or plates.

According to preferred developments of the invention, the cooling body has a fastening edge and by means thereof is fastened to the robot and the cooling device is in particular secured to the robot accompanied by the interposing of a thermal insulator. From the outset it is also possible for the fastening edge to be thermally insulated against the cooling body. In this case no separate thermal insulation is required. The thermal insulation can also be integrated into the fastening edge on the cooling body.

So that the complete robot contour takes not take up an excessive amount of space as a result of the decentral distribution of drive electronics thereon, particularly on the rocker arm and at the same time to utilize the contour and shape resulting from the necessary construction of the robot structure or the individual mechanical robot elements, according to a further development of the invention a drive electronics projects into a recess or a cavity of the robot structure and then fulfils the function of a housing (of a conventional control cabinet) and therefore mechanically protects and electrically shields the drive electronics, thereby ensuring a corresponding protective system particularly according to IP 67, so that the drive electronics can be constructed in casing-free manner, without any complicated casing.

According to another preferred development the mechanical connection of the drive electronics, which can take place by means of the fastening edge of the cooling device to the robot structure is separated from the electrical contacting of the drive electronics with its electric power supply lines. IN a preferred development a breadboard connected to the supply cables is provided having plug contacts by means of which the drive electronics is electrically contacted.

Alternatively either the breadboard is connected directly to the robot structure or the cooling device is fastened, whilst interposing the breadboard, with the latter to the robot structure.

As stated, the drive electronics in particular include power semiconductors and the circuit parts directly associated therewith such as drive units, ammeters and a microprocessor, which generates PWM signals, which implements the current regulation, the necessary monitoring and communications with the control means. An intermediate circuit supply unit can be implemented both centrally, e.g. in the drive box on the carousel or distributed over all the drive electronics. The invention permits a cost saving, open construction of the drive amplifier and the use of inexpensive connectors for connection to the back plane. For the cables running in the interior and the connectors it is possible to use inexpensive constructions. As a result of the plugging principle a simple replaceability of the drive amplifier is possible and servicing is greatly facilitated. It is also possible for two or three low power drive amplifiers to be mechanically combined into a unit, which leads to cost and space savings through the omission or joint use of some parts.

BRIEF DESCRIPTION OF THE DRAWINGS

Further advantages and features of the invention can be gathered from the claims and the following description of an embodiment of a robot according to the invention with reference to the attached drawings, wherein show:

DETAILED DESCRIPTION OF THE DRAWINGS

Figure 1:
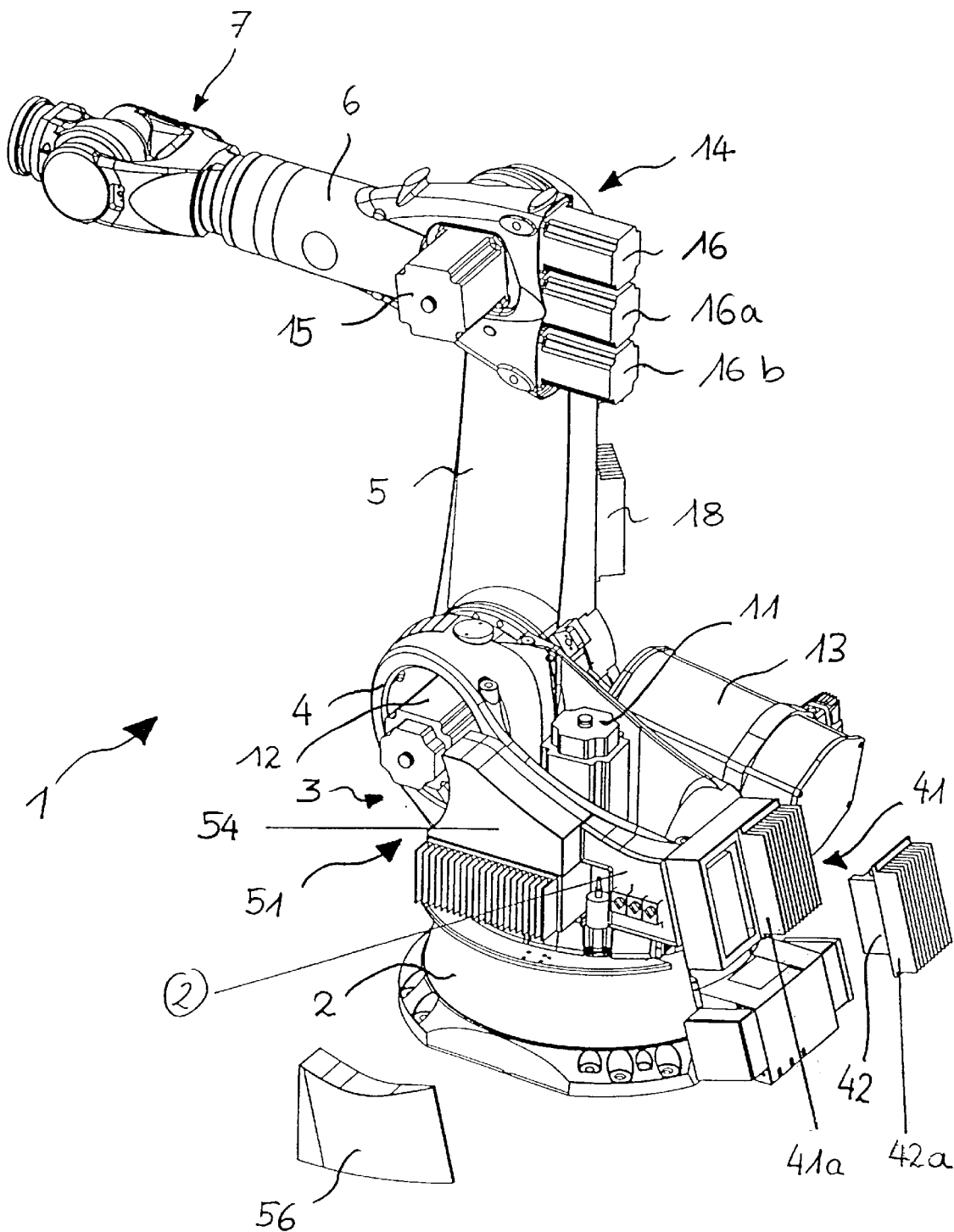
FIG. 1 A perspective side view of a robot according to the invention.
Figure 2:
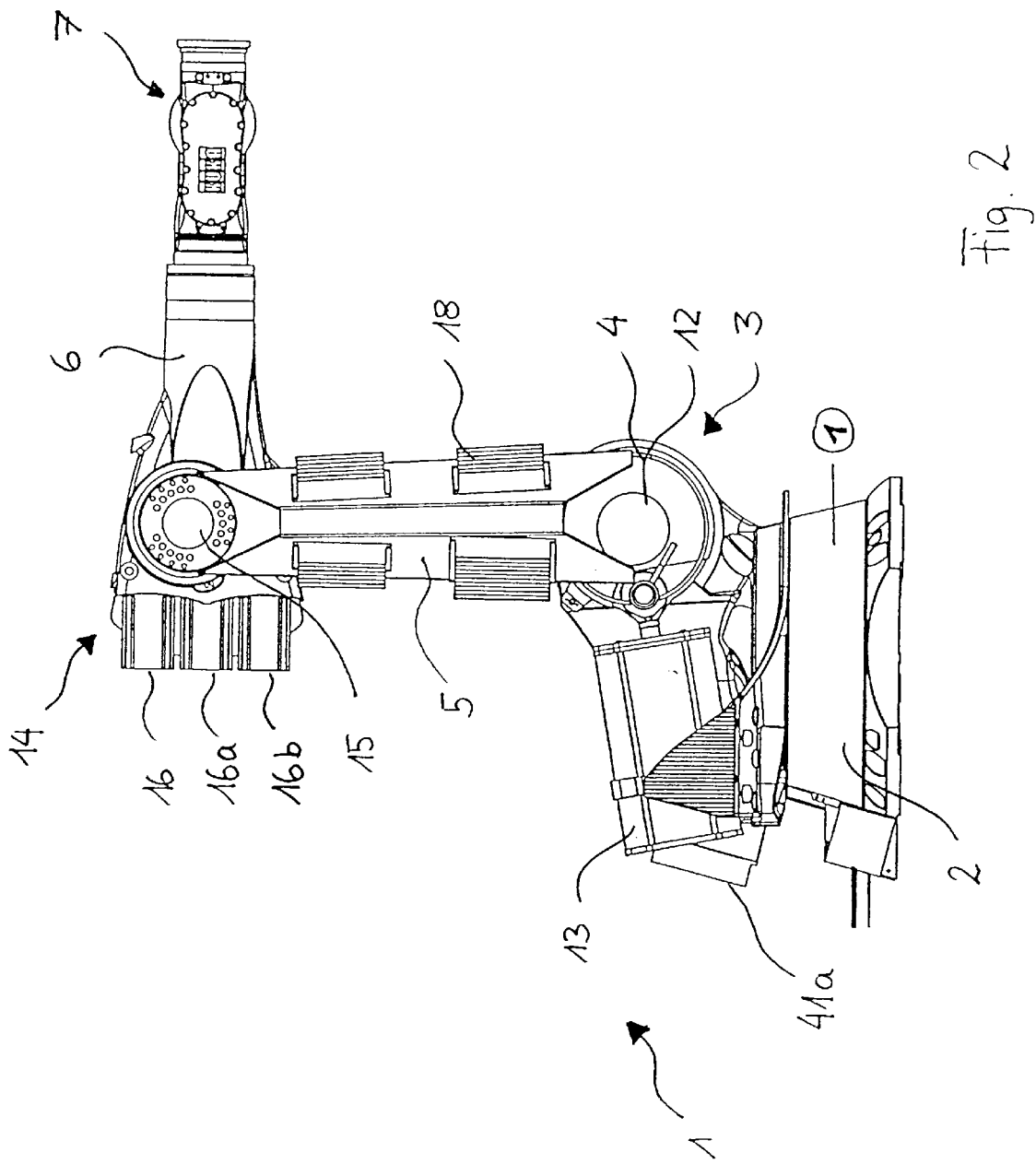
FIG. 2 A side view of the robot of FIG. 1 from the side remote from the latter.

A robot 1 according to the invention, such as the six-axis robot shown, has the conventional structure or conventional mechanical construction of such a robot. The rotary carousel 3 is located on a base 2. The carousel inter alia carries a bearing part 4 for a rocker arm 5 on which the robot arm 6 is pivotably mounted about the A3 axis. The arm 6 carries the robot hand 7, which is itself pivotable about the A4 axis aligned with the axis of arm 6 and further elements pivotable about the A5 and A6 axis.

The carousel 3 also carries a drive motor 11 for pivoting the carousel 3 about the vertical A1 axis. On the bearing part 4 of carousel 3 is provided a drive motor 12 for pivoting the arm 5 about the A1 axis. The carousel 3 carries a weight compensation 13 in the form of a spring. In the articulation 14 of arm 6 on rocker arm 5 is provided a drive motor 15 for pivoting the arm. On its side remote from the hand 7 the arm 6 carries drive motors 16, 16a, 16b for moving the hand 7 and the individual parts thereof.

Figure 3:
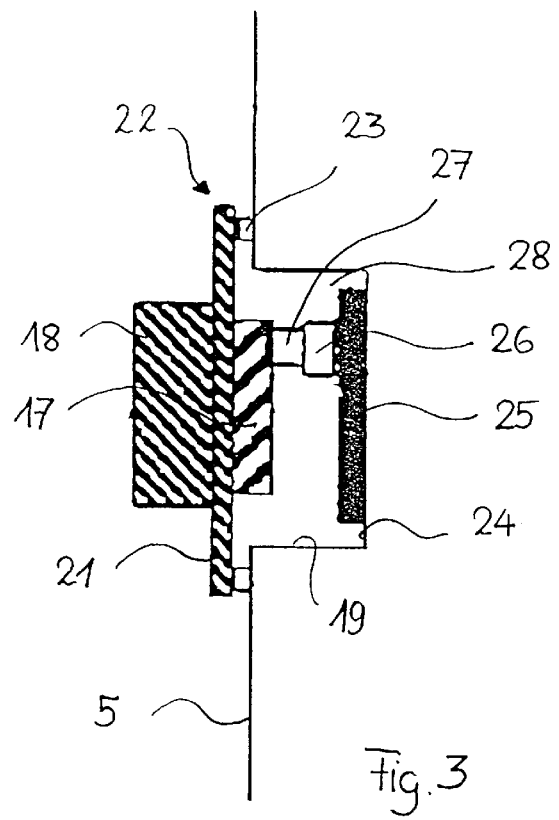
FIGS. 3 & 4 Diagrammatic representations concerning the integration of drive electronics in the robot structure on a robot arm.
Figure 4:
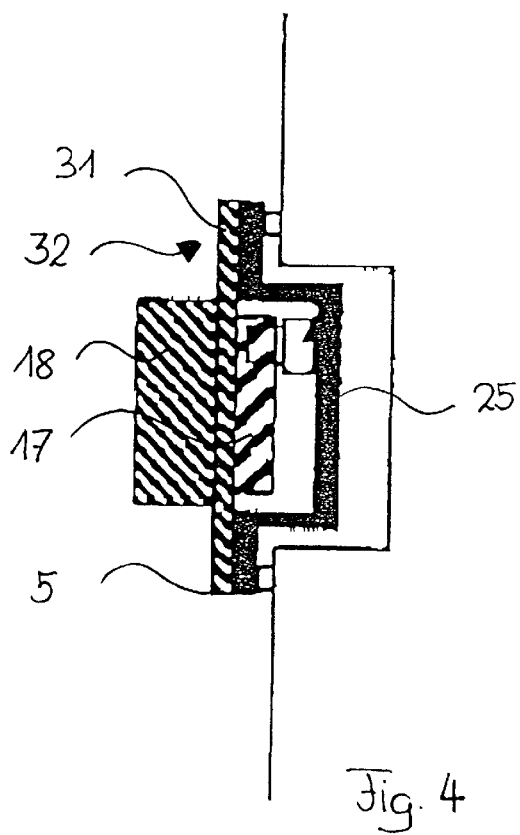

The robot according to the invention also has drive elements or drive electronics 17, 41, 42, 51, 52, 53 arranged in distributed or decentral manner on the structure, which in particular can in each case comprise an inverter with an intermediate circuit supply unit, a resolver digital converter and ballast resistor or feedback module, optionally also a low voltage supply unit and electronics such as a control means, as well as installation locations for the integration of further electronic subassemblies. The latter are integrated into the robot structure and in the represented embodiment the drive electronics 17 for the drive motors 15 to 16b are distributed in the rocker arm 5 (FIGS. 3 and 4).

Figure 5:
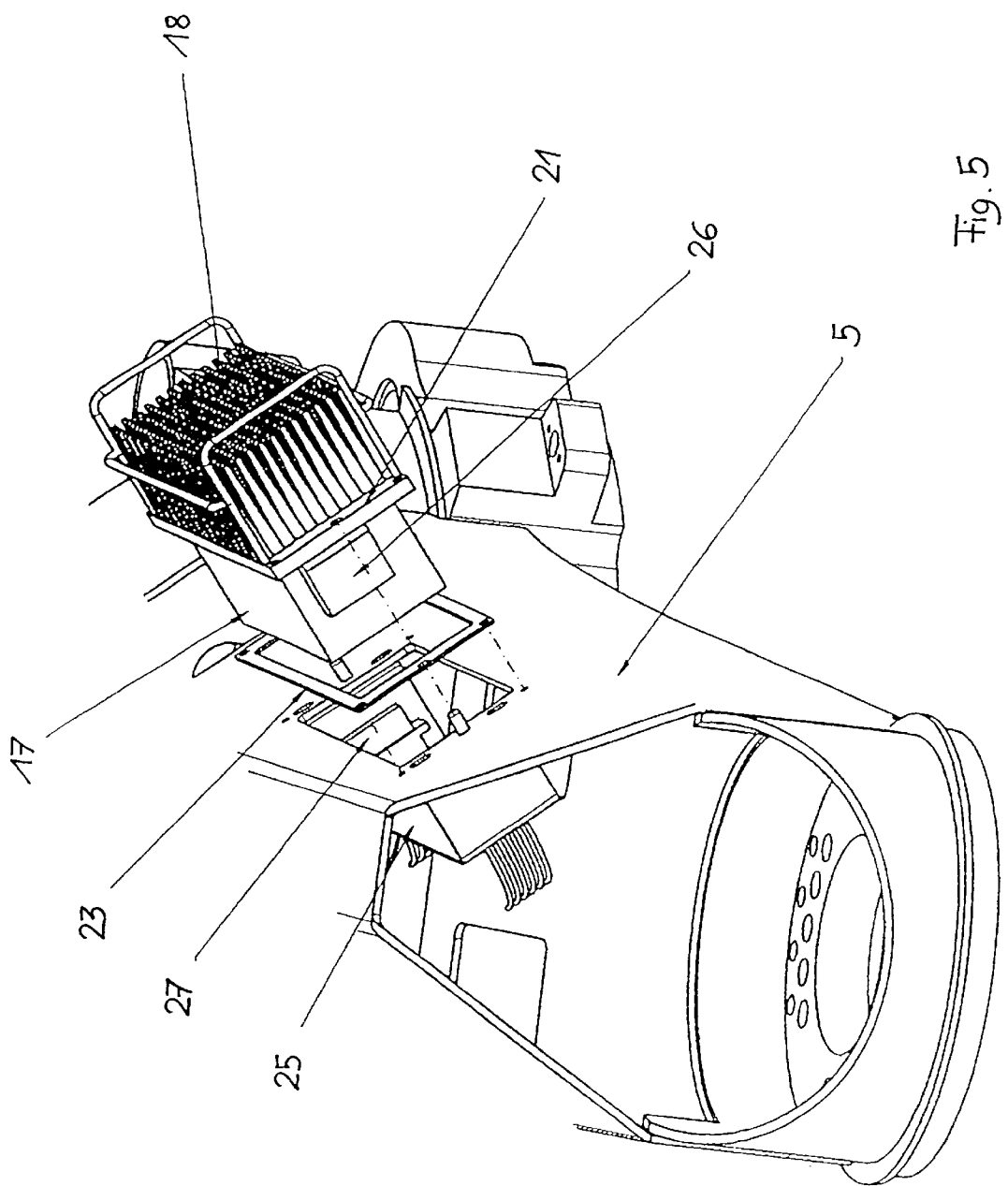
FIG. 5 A perspective exploded view of a rocker arm with drive electronics and cooler body.
Figure 6:
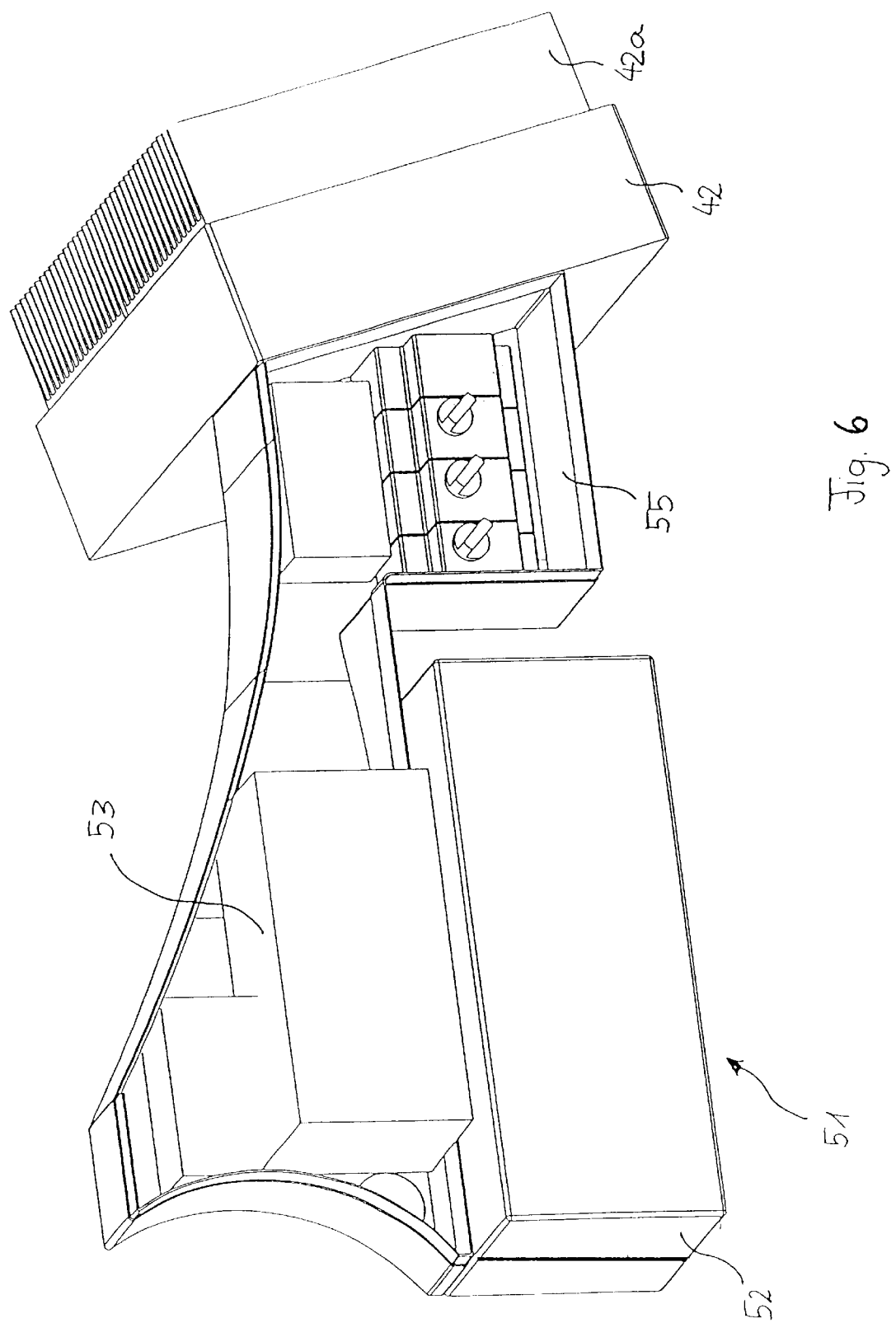
FIG. 6 A representation of the drive electronics for rotary and rocker arm drive on the robot carousel.

As can in particular be gathered from FIG. 5, the drive electronics for heat dissipation are provided on their side facing outwards with passive cooling devices and cooling bodies in the form of cooling ribs, cooling rods, etc.

For the reception of the drive electronics 17 in the robot structure are provided in the rocker arm 5 recesses or depressions 19 in which are embedded the drive electronics 17.

For holding or retaining drive electronics 17 with the associated cooling device 18 a fastening edge is provided from which projects inwards the drive electronics 17 and outwards the cooling device 18.

The fastening edge 21 is secured to the robot structure, here the rocker arm 5, outside the depression 19 and namely at location 22, whilst interposing a thermal insulator 23. Fixing can take place by means of screws, etc.

On the bottom 24 of the depression 19 of the robot structure (rocker arm 5) is provided a back plane or breadboard 25, which carries plug-in connections 26 for the electrical connection to a corresponding plug-in connection 27 on the drive electronics 17 for forming a connector 28 provided by both connections 26, 27.

In the construction of FIG. 4 the breadboard 25, unlike in the construction of FIG. 3, is not planar and directly connected to the bottom 24 of the depression 19. In FIG. 4 the breadboard 25 is constructed in U or cup-shaped manner and has an outwardly turned circumferential edge 31 with which it engages under the fastening edge 31, so that via the edge of the breadboard 25 it is fixed to the robot structure 5.

Alternatively a breadboard is freely movable with respect to the cooling device. For this purpose the breadboard as a result of an adequate length reserve of the connected cable for producing the plug connection can be drawn so far out of the interior of the robot structure that plugging in can take place with a mechanically released connection in order on the one hand to avoid undesired forces by aligning problems during plugging in and on the other to permit plugging to take place with good vision conditions.

Through the inventive solution of providing active cooling devices or passive cooling devices with cooling bodies directed outwards from the robot structure in the form of cooling ribs, cooling rods, etc. an effective heat dissipation of the heat generated by the drive electronics is obtained and therefore an effective cooling or heat removal with respect to the drive electronics, whilst avoiding any heat dissipation via the robot structure so as to bring about a heating of the latter and which could lead to mechanical and geometrical imprecisions. This is in particular aided by the fact that the drive electronics are mechanically fixed to the robot structure in such a way that the cooling device is thermally insulated by it.

In FIGS. 1 41, 42 indicate axial amplifier modules provided with cooling devices 41a, 42a which can be fixed or are fixable in the manner described hereinbefore to the robot structure, here in carousel 3. As can also be gathered from FIG. 1, on the carousel 3, namely laterally of the bearing part 4, there is a drive box 51 with jointly used subassemblies, such as e.g. a low voltage supply unit, which is provided with a cooling device 52.

LIST OF REFERENCE NUMERALS

1 Robot
2 Base
3 Rotary carousel
4 Rocker part
5 Rocker arm
6 Robot arm
7 Robot hand
11/12 Drive motor
13 Weight compensation
14 Articulation
16/16a, b Drive motors
17 Drive electronics
18 Cooling device
21 Drive unit fastening edge
19 Depression
23 Thermal insulator
24 Bottom
25 Breadboard
26/27 Plug-in connections
28 Connector
31 Circumferential edge
32 Edge area
41a/42a Cooling device
51 Drive box
52 Cooling device
53 Electronic module
54 Cover
55 Acceptability area
56 Cover

What is claimed is:

1. A robot comprising:

a robot structure;

drive electronics, servo amplifiers and inverters for operating the robot are arranged in a distributed manner on said robot structure, each said drive electronics being thermally insulated with respect to said robot structure;

a cooling device arranged on each of said drive electronics for cooling said drive electronics.

2. A robot according to claim 1, wherein: the drive electronics are thermally conductively connected to an outwardly directed passive cooling device.

3. A robot according to claim 1, wherein: the drive electronics are provided with active cooling devices.

4. A robot according to claim 1, wherein: each of said drive electronics is mechanically connected to a cooling device associated therewith.

5. A robot according to claim 1, wherein: said each drive electronics is held on the robot by its cooling device.

6. A robot according to claim 1, wherein: said cooling device has a cooling body with cooling ribs or plates.

7. A robot according to claim 1, wherein: said drive electronics has a fastening edge and is secured by the latter to the robot structure.

8. A robot according to claim 1, wherein: the cooling device is fixed to the robot, whilst interposing a thermal insulator.

9. A robot according to claim 1, wherein: said drive electronics projects into a recess or cavity of the robot structure.

10. A robot according to claim 1, wherein: a breadboard connected to supply cables is provided and said breadboard has plug-in-contacts for the drive electronics electrically contacting the latter.

11. A robot according to claim 10, wherein: the breadboard is directly connected to the robot structure.

12. A robot according to claim 10, wherein: the cooling device, accompanied by an interposing of the breadboard, is fixed with the latter to the robot structure.

13. A robot comprising:

a plurality of interconnected links;

a plurality of drives for moving said plurality of links;

a plurality of electronic drive units for controlling said plurality of drives, each of said plurality of electronic drive units being arranged on said links and being spaced from each other;

thermal insulation arranged between said each of said plurality of electronic drive units and said links;

a plurality of cooling devices individually connected to one of said plurality of electronic drive units.

14. A robot in accordance with claim 13, wherein:

said plurality of electronic drive units include at least one of servo amplifiers, inverters, ballast resistors, feedback modules, resolver digital converters, and voltage supply units, said cooling devices are arranged spaced from said links.

15. A robot in accordance with claim 13, wherein:

said cooling devices are an outwardly directed passive cooling device.

16. A robot in accordance with claim 13, wherein:

said cooling device is an active cooling device.

17. A robot in accordance with claim 13, wherein:

said each of said plurality of electronic drive units is mechanically connected to one of said plurality of cooling devices.

18. A robot in accordance with claim 13, wherein:

said cooling devices have a cooling body with cooling ribs or plates.

19. A robot in accordance with claim 13, further comprising:

a plurality of breadboards connected to supply cables, each of said breadboards having plug-in-contacts connected to said electronic drive units, said each breadboard being directly connected to said links;

said cooling device is fixed by said breadboard to said links.

20. A robot comprising:

a plurality of interconnected links;

a plurality of drives for moving said plurality of links;

a plurality of electronic drive units for controlling said plurality of drives, at least some of said plurality of electronic drive units being arranged in recesses provided on said links;

thermal insulation arranged between said electronic drive units and said links;

a plurality of cooling devices individually connected to one of said plurality of electronic drive units.

* * * * *